United States Patent

Amland et al.

[15] 3,667,284

[45] June 6, 1972

[54] TAPERED BORE PROBE

[72] Inventors: Ronald D. Amland, Los Angeles; Robert L. Castle, El Segundo, both of Calif.

[73] Assignee: Gar Honing Service, Inc., El Segundo, Calif.

[22] Filed: Apr. 27, 1970

[21] Appl. No.: 32,300

[52] U.S. Cl. .................................................. 73/37.9
[51] Int. Cl. ........................................... G01b 13/18
[58] Field of Search ............... 33/DIG. 2; 73/37.8, 37.9, 37.5

[56] References Cited

UNITED STATES PATENTS 2,358,769   9/1944   Aller .......................................... 73/37.9

*Primary Examiner*—Louis R. Prince
*Assistant Examiner*—William A. Henry, II
*Attorney*—Smyth, Roston & Pavitt

[57] ABSTRACT

An instrument for verifying the taper angle of a tapered bore comprising a handle portion to which a tapered probe is fixed. The tapered probe is formed so as to have a proper diametral relationship throughout its length with the tapered bore to be verified and has a plurality of radial jets therein, each corresponding to a different bore position. Coaxial passages are formed in the handle portion and the probe and a connecting rod is movable by an operator in an axial direction therein. Air is passed through an axial bore in the connecting rod for delivery to a piston at the opposite end thereof through which it is radially expelled through one of the probe radial jets. The connecting rod may be moved to predetermined positions, each corresponding to one radial jet, so that the piston may be properly aligned therewith. As the air passes through the probe radial jets, it is directed against the surface of the bore, creating a back pressure in the air system. Proper diametral sizing of the respective jets will cause equal back pressure readings to be generated when air is selectively passed through each of the radial jets, if the bore is properly tapered. If the bore is not properly tapered, the back pressure readings will vary between different radial passages.

13 Claims, 5 Drawing Figures

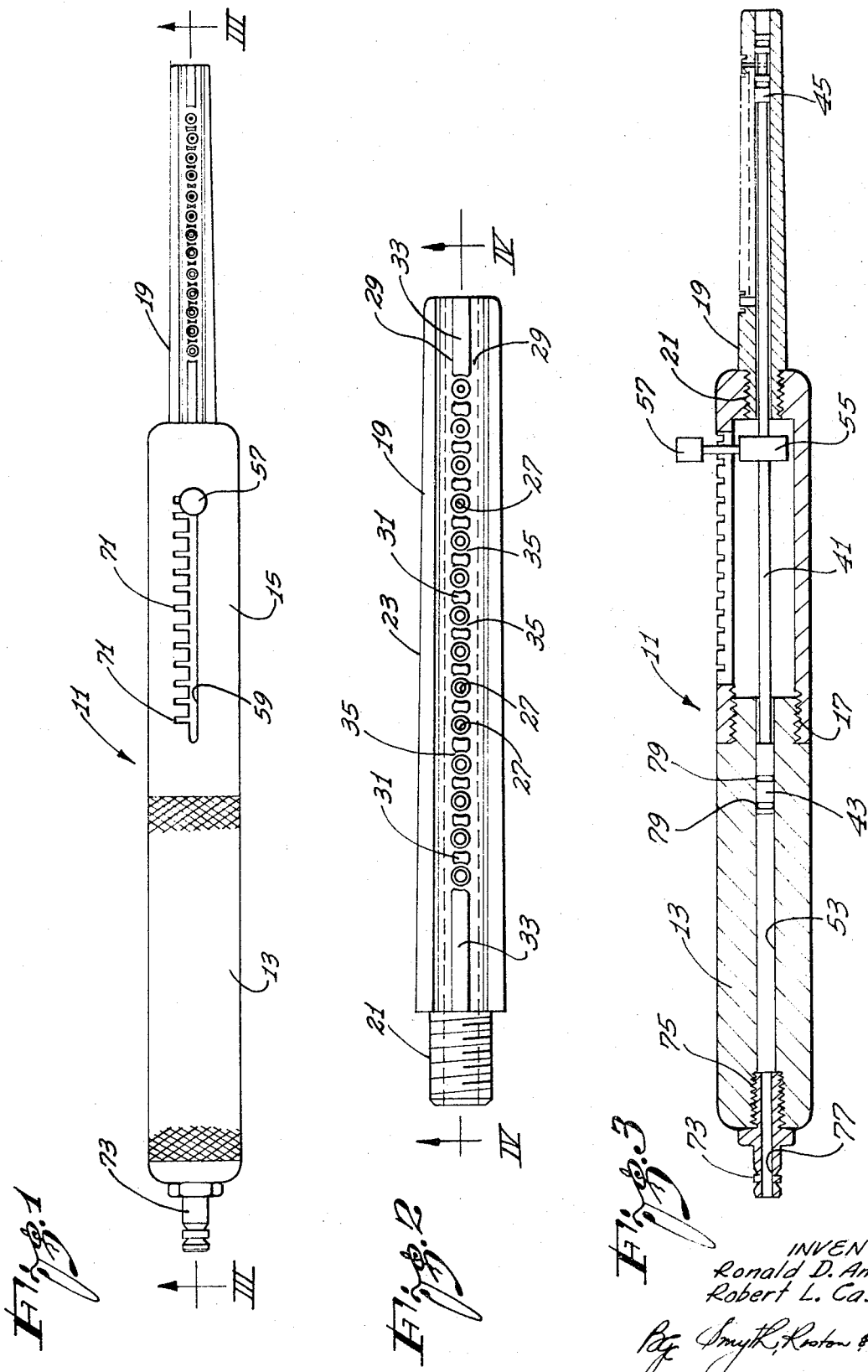

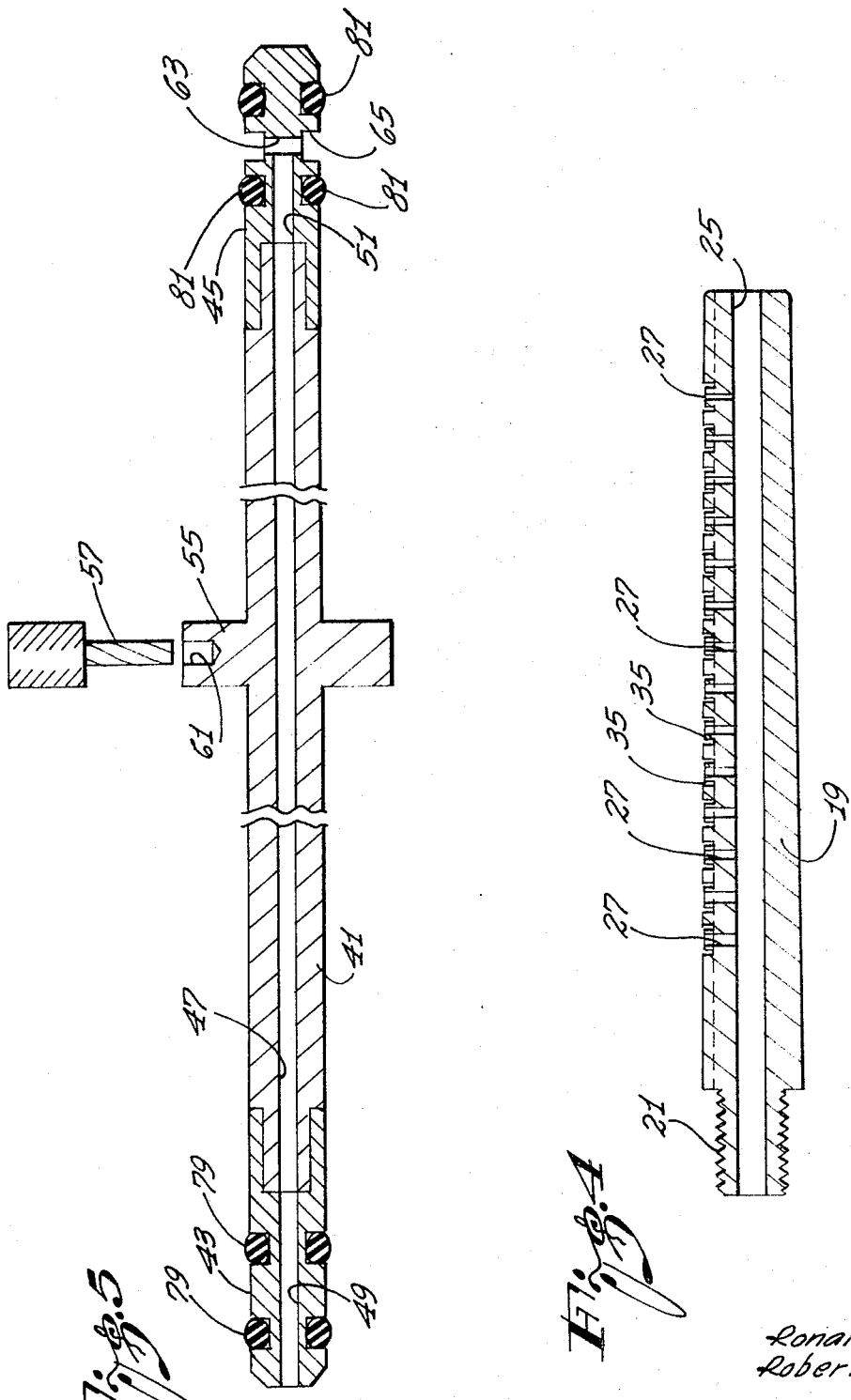

TAPERED BORE PROBE

BACKGROUND OF THE INVENTION

In many manufacturing operations, bores must be formed having tapered surfaces extending throughout a major portion of the length thereof. For example, in joining certain aircraft parts, mating steps are formed in adjacent pieces which are then abutted with the steps being overlapped. A bore is drilled through the abutted step portions and a female member having a tapered bore and a male member with a complementary surface are fastened together through the drilled bore. If any discrepancy exists between the tapers of the female and male members, a complete surface-to-surface contact between the members will not occur, resulting in a weak joint.

In the formation of tapered bores, it often occurs that, as viewed in axial cross section, the sides of the bore bow outwardly or inwardly so that the taper does not occur along a single angular line. When this happens, the surface-to-surface contact desired cannot be made. However, it is nearly impossible to determine visually whether or not is has been made. Therefore, some apparatus must be used to measure the taper of both of the members.

A wide variety of devices, such as sine plates and gauge blocks have been produced for verifying the taper on the male member and such verification is relatively simple to perform.

The verification of the female member, however, has proven to be somewhat more difficult and complex due to the problems involved with accurately measuring an internal dimension which is constantly varying.

One apparatus used for verifying the internal taper has comprised a probe which is manufactured so as to have a diametral and taper relationship which will exactly complement that desired in the bore. A coat of bluing is painted on the probe so that when the probe is inserted into the bore, the bluing will be transferred from the periphery of the probe to the surface of the bore. If the relationships are exactly complementary, the bluing will be evenly distributed over the surface of the bore. Unfortunately, this method can only be partially successful — particularly, when the maximum diameter of the bore is so small as to make viewing of the entire internal surface difficult. Further, if the bore is slightly out-of-center along lines in a plane containing the axis of the bore, the bluing may still appear to be evenly distributed during the external viewing since variations in the shade or color of the bluing, caused by variations in the depth thereof on the walls of the bore, will not be visible.

Another device utilized for verifying the internal taper comprises a probe having a relatively slender axially directed shaft having two disks mounted on the shaft in perpendicular relationship thereto. The disks are spaced a predetermined distance apart and vary in diameter so that a disk on the leading end of the shaft will extend nearly to the bottom of the bore and a larger disk, further up on the shaft, will abut the walls of the bore at a predetermined position measured along the axis of the bore. Air then is passed through the shaft and selectively distributed to one disk or the other so that it may be delivered to radial passages in the disk. When the air reaches the end of the radial passage at the periphery of the disk, it is forced outwardly therefrom against the surface of the tapered bore. A proper relationship between the disks and the bore will cause a back pressure to be generated within the air delivery system which should be constant along every radius for both disks, if the taper is correct at the axial position of the disk.

While this latter device is accurate for the axial positions at which the disks are mounted on the shaft, the device yields no information as to taper in the surface between the disks and the exactness of the taper in the intermediate section must be presumed to be correct. Unfortunately, this presumption is not always accurate.

In some applications an accurately machined sphere may be dropped into the tapered bore and the distance it protrudes may be measured. However, this device can only be used to verify the single line along which the sphere and bore should contact.

Another device which has been produced for the verification of an internal taper comprises a probe having a tapered surface extending substantially about the periphery thereof and machined so that the periphery and diameter are identical to those desired for the bore. A guide surface, resembling a key-way, is formed in the periphery of the probe in a plane which includes the axis of the probe. An air distribution device, resembling a key, is positioned within the guide for movement along the periphery of the probe. A very slender air passage guide connects the distribution device with an air source. As the device moves up and down the probe, and the probe is rotated, if the taper of the bore is accurate, a constant back pressure is experienced within the air system.

This latter type of device is somewhat difficult to manufacture and use since the tolerances between the guide and the air distribution device must be very accurate to insure proper measurement of the air back pressure. Additionally, they are susceptible to dirt getting into the guide and restricting the movement of the air distribution device. Also the device's position relative to the guide surfaces may be altered by the dirt, affecting the accuracy of the taper measurement.

Thus, none of the known tools for verifying the taper of a bore are totally reliable and accurate.

SUMMARY OF THE INVENTION

The present invention generally relates to a new and improved apparatus for verifying the taper of a bore. More specifically, the apparatus comprises a probe which may be positioned within a bore so that air passing through the probe is selectively impinged against the surface of the bore to create a back pressure which may be read through any suitable system, such as a Bourdon tube.

The probe is formed with a number of radially directed passages or jets extending between a central passage therein and the external periphery thereof. Air is selectively delivered to these passages by an axially movable connecting rod having air passage means and sealing means associated therewith so that air may be delivered to only one such passage at a time.

The structure of the present invention allows the probe operator to determine the back pressure created, and thus verify the bore taper, by delivering air to each of the passages individually, thus verifying substantially the entire length of the bore. If desired, the probe may be rotated about its axis so that this verification can be made at a plurality of positions about the periphery of the bore.

The instrument is simple and easy to use and is not susceptible to misreadings caused by dirt, etc. The only moving parts of the probe are contained within the axial passage thereof so that foreign matter is prevented from obstructing the proper positioning of the instrument within the bore. Since there are no external moving parts except for the operator-actuated handle which axially moves the connecting rod, the bore taper can be verified at a speed limited only by the operator's ability to note the back pressure generated at each position.

Further advantages, objects, modes, and embodiments of this invention will become obvious to those skilled in the art by reference to the detailed description and accompanying drawings which illustrate what is presently considered to be one preferred embodiment of the best mode contemplated for utilizing the novel principles set forth in the appended claims.

BRIEF DESCRIPTION OF THE DRAWINGS

FIG. 1 is an axial elevation of a probe formed according to the present invention;

FIG. 2 is an enlargement of the tapered section of the probe, illustrated at the right end of FIG. 1;

FIG. 3 is an axial cross sectional illustration of the probe shown in FIG. 1, taken along a line III—III thereof;

FIG. 4 is an enlarged cross sectional illustration of the tapered portion of the probe taken along a line IV—IV of FIG. 2; and FIG. 5 is an enlarged cross sectional illustration of the connecting rod mounted within an axial bore extending through the instrument.

DETAILED DESCRIPTION

Referring now to FIGS. 1 and 3 in greater detail, there is shown a tool 11 having a handle portion 13 threadedly attached to a control section 15 by means of mating threads 17. The control section is, in turn, fastened to a tapered probe 19 by means of a mating threaded section 21 at the opposite end thereof from the threaded section 17. As will be seen, this structure allows the tool to be relatively compact so that it may easily be moved and operated. Of course, the sections could be fastened together in other ways or could be manufactured in fewer parts.

As shown in FIGS. 2 and 4, the probe 19 comprises a body portion having a tapered surface 23 which is machined so as to be at the proper diametral and taper relationship with a bore which is to be verified. A cylinder-like axial passage 25 is formed within the probe and a plurality of radial jets 27 extend from the axial passage 25 to positions which are very slightly radially inward from the surface 23.

On either or both sides of the jets 27 a recess or groove 29 may be formed so as to provide an air-way through which air passing through the jets 27 may be exhausted from the tool and the bore being verified. Intermediate the jets 27, support members 31 are provided, or more correctly, are not machined away, so as to provide suitable spacing between the probe and the end of each jet. The radially outward surfaces of the support members 31 and the radially outward surfaces of support members 33 at the opposite ends of the probe are formed at the same radius and taper as the major surface 23 thereof. Intermediate each support member 31 and jet 27, a recess 35 has been formed so that as air passes through each jet 27 it will be exhausted therefrom throughout the outer circumference thereof. In other words, since the jets terminate at positions which are slightly recessed relative to the surface 23, the recesses 35 and the air-ways 29 provide suitable air passage means to allow air being exhausted from the jets 27 to impinge against the tapered surface of the bore without being restricted in any way by the periphery of the probe.

In order to produce an identical airflow through each of the radial jets 27 and to create an identical back pressure for each jet if the taper being verified is accurate, it is necessary to increase the diameter of the jet as the axial length thereof is increased. For example, with reference to FIG. 4, as the jet lengths increase from right to left, as seen in the figure, the diameters thereof must also be increased very slightly so that the volume of flow will be identical. Thus, the radial jet 27 closest to the threaded section 21 is both longer and larger in radius than the jet adjacent thereto, and so forth.

With reference now to FIGS. 3 and 5, a connecting rod 41 is provided with a first piston end 43 and a second piston end 45. A bore 47 extends throughout the length of the rod 41 and is coaxial with a bore 49 in the piston 43 and a bore 51 in the piston 45. As shown in FIG. 5, the connecting rod 41 and the pistons 43 and 45 are formed as separate members; it will be obvious to those skilled in the art that, if desired, the entire structure could be formed as a single element.

The pistons 43 and 45 are press-fitted or otherwise suitably mounted on the ends of the connecting rod 41, and the piston 45 and rod 41 extend into the cylinder-like axial passage 25 in the probe. Piston 43 and rod 41 similarly extend into cylinder-like axial passage 53 in the handle 13.

A collar 55, either formed integral with or suitably attached to the rod 41, is mounted on an intermediate portion of the rod 41 and is fixed against movement relative thereto. An operator-actuated handle member 57 extends through a slot 59 in the control section 15 and may be suitably fastened within a bore 61 in the collar 55. The handle 51 and collar 55 serve as a means for moving the rod. Of course, this means is meant to merely be exemplary.

The axial bore 51 in the piston 45 communicates with a radial bore 63 therein which allows the air to pass into a peripheral groove 65 in the piston. As the control handle 57 is moved along the slot 59, the position of the connecting rod is altered so that the peripheral groove 65 is positioned along the axis of the tapered probe opposite each of the radial jets 27. To ensure positioning accuracy, a plurality of control slots 71 are formed to communicate with the slot 59 so that the operator can move the handle 57 into the particular control slot associated with the radial jet 27 selected for verification of the taper.

In use, air is delivered to the handle portion 13 by means of a fitting 73 which is suitably secured thereto, such as by a threaded section 75. As the air passes through an axial bore 77 in the fitting, it is delivered to the passage 53. Since the first piston 43 is provided with suitable seals, such as O-rings 79, the air in the passage 53 is restricted from leaving the passage except through the rod bore 49.

The operator may select the radial jet 27 through which the air is to be passed by moving the handle 57 in the manner previously described so that it is positioned in a selected control slot 71. This action will cause the groove 65 to be positioned opposite the selected jet. As the air passes through the passage 57, it is transferred to the bore 51 and radial bore 63. It then is exhausted through the groove 65 and the selected jet 27, by means of which it is impinged against the tapered surface of the bore being verified. Seals 81 prevent the air from escaping except via the selected bore.

The air leaving the bore impinges upon the adjacent bore surface, creating a back pressure in the air system due to the flow restriction thus generated. The back pressure may be read on a suitable gauge system. The operator may then rotate the probe through a 360° circle and observe any back pressure changes. A new jet may then be selected by movement of the rod as described and the process is then repeated. In this manner, the taper of the bore can be verified substantially along its entire length since the bore surface between the jets can logically be assumed to be of constant taper since the passages may be placed very close together if desired.

With measurement devices of this type, it is imperative that, when measuring a perfect taper, the back-pressure reading generated by each jet be identical to that generated by every other jet. Otherwise, when measuring tapered bores with the tool, it will be impossible to determine whether reading differences result from the jets themselves or from imperfections in the tapers. It has been discovered by this invention that properly relating the jet diameters to their axial lengths, so that a longer jet is provided with a large diameter, will result in such identical back-pressure readings. Thus, even though adjacent jets may have diameters which differ by only two or three ten-thousandths of an inch (if they are closs together and have only slightly different lengths), such differences are significant in generating accurate and identical back-pressure readings.

If the jet diameters are not varied in this manner, the tool will produce substantially inaccurate and/or unusable readings, and its use even then will be limited to tapered bores which are nearly cylindrical so that there is essentially little or no variation in the lengths of the radial jets. On the other hand, measurement tools utilizing the present invention can be used to accurately verify the tapers of bores of any diameter and degree of taper, merely by properly proportioning the diameters and radii of the jets.

Many modifications of the illustrated embodiment and other embodiments of the invention will be obvious to those skilled in the art. For example, the handle 57 could be spring-biased into a locking position within the control slots 71, the probe 19 could be formed with any peripheral surface, etc. Through the use of the claimed invention, however, tapered bores may be quickly and easily verified merely by operating the connecting rod 41 in the described manner. Additionally, even cylindrical or other shaped bores could be verified by similar instruments. Since the air delivery system is totally contained within the tool and is separated from the area which could possibly receive dirt, i.e., by the seal rings 79 and 81, the readings generated by the use of the tool will not be effected by dirt or other foreign matter as is possible with the prior art devices. Thus, the applicants have provided a new and improved concept in measuring instruments which yields a true advance in that art. As previously stated, many further modifications and alterations utilizing the concepts of this invention will be obvious to those skilled in the art, wherefore what is claimed as the invention is:

We claim:

1. An instrument for verifying the shape of the internal wall of a bore comprising:
    a probe insertable into a bore to be verified and having
    a configuration complementary to that desired in the bore,
    means therein for providing air under pressure,
    a plurality of air jet means extending radially within said probe between said air pressure providing means and the external periphery of said probe for impingement of air on the wall of the bore when the probe is inserted therein, each of said plurality of jets having a diameter which is dependent upon the length thereof, the jet diameter increasing as jet length increases,
    means for individually selecting one of said plurality of air jet means for passage of air therethrough, and
    means for preventing the passage of air through any other of said plurality of air jet means when one such means has been so selected.

2. The instrument of claim 1 wherein
    said probe includes means for allowing the passage of air out of the bore after it has impinged upon the wall thereof.

3. The instrument of claim 1 wherein
    said probe includes
    means on the periphery thereof for allowing the air moving through said plurality of air jet means to be evenly expelled about the periphery of each of such air means.

4. The instrument of claim 1 wherein the bore to be verified is tapered and
    said plurality of air jet means comprises
    a series of jets, each progressively longer than the adjacent such jet as the diameter of said probe increases due to the angle of taper.

5. The instrument of claim 1 wherein
    said selecting means comprises
    a cylinder-like bore within said probe and
    a piston-like member movable within said cylinder-like bore.

6. The instrument of claim 5 wherein
    said air providing means comprises
    a bore in said piston-like member for communication with a source of pressurized air, and
    means in said piston-like member connecting said air providing bore to the selected one of said plurality of air jet means.

7. The instrument of claim 6 wherein
    said preventing means comprises
    sealing means mounted on said piston-like member adjacent said connecting means and in sealing contact with said cylinder-like bore.

8. The instrument of claim 5 including
    means attached to said piston-like member for moving it within said cylinder-like bore.

9. The instrument of claim 1 including
    means for properly positioning and ascertaining the positions of said selecting means opposite each of said plurality of air jets when said probe is within a bore to be verified, without requiring the withdrawal of the probe therefrom.

10. An instrument for verifying the taper of a tapered bore comprising
    a probe so tapered and sized to complement the intended taper and size of the bore to be verified,
    an air passage means within said probe through which fluid under pressure may be passed,
    a plurality of jets, each extending substantially perpendicular to the axis of the probe from said air passage means to a position adjacent the periphery of said probe, each jet having a diameter of a size dependent upon the distance from said air passage means to the probe periphery, the jet diameter increasing as jet length increases, and
    means for delivering fluid under pressure from said air passage means to one of said plurality of jets at a time.

11. The instrument of claim 14 including
    means slightly inwardly spaced from the periphery of said probe about each of said plurality of jets for allowing passage of air from said jets out of the bore being verified.

12. The tool of claim 11 including
    means in said fluid passage means for restricting the passage of fluid to one of said plurality of jets at a time.

13. A tool for verifying a bore taper comprising
    a probe of such size and tapered configuration as to substantially complement the bore and having
    fluid passage means therein and
    a plurality of jets extending from said fluid passage means to locations slightly inwardly spaced from the periphery of said probe and open at the outer ends thereof for passage of fluid therethrough against the surface of the bore opposite the jets, each jet having
    a diameter directly proportioned to the length thereof such that the longest jet has the largest diameter and the shortest jet has the smallest diameter.

* * * * *